(12) United States Patent
Noguki

(10) Patent No.: US 6,582,161 B2
(45) Date of Patent: Jun. 24, 2003

(54) PNEUMATIC TRANSPORT OF CHARGEABLE RESIN POWDER

(75) Inventor: Genji Noguki, Ibaraki-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 55 days.

(21) Appl. No.: 09/863,278

(22) Filed: May 24, 2001

(65) Prior Publication Data

US 2001/0046420 A1 Nov. 29, 2001

(30) Foreign Application Priority Data

Jun. 1, 2000 (JP) ......................................... 2000-164393

(51) Int. Cl.⁷ ............................................... B65G 53/00
(52) U.S. Cl. ........................... 406/197; 406/48; 406/198
(58) Field of Search ............................. 406/48, 197, 198

(56) References Cited

U.S. PATENT DOCUMENTS

| | | | | |
|---|---|---|---|---|
| 3,080,354 A | * | 3/1963 | Moon | ........................... 159/44 |
| 3,347,599 A | * | 10/1967 | Topper et al. | ............... 406/197 |
| 4,077,135 A | * | 3/1978 | Tzschoppe et al. | ............ 34/593 |
| 4,789,272 A | * | 12/1988 | Matsubara et al. | .. 241/DIG. 31 |
| 4,937,271 A | * | 6/1990 | Akamatsu et al. | ............. 521/58 |
| 5,665,836 A | * | 9/1997 | Tanaka et al. | ............... 523/334 |
| 5,992,335 A | * | 11/1999 | Nakamura et al. | ........... 110/342 |

FOREIGN PATENT DOCUMENTS

| | | |
|---|---|---|
| JP | 52-032770 | 9/1993 |
| JP | 6-184221 | 5/1994 |
| JP | 2001-139140 | 5/2001 |

* cited by examiner

Primary Examiner—Joseph A. Dillon
(74) Attorney, Agent, or Firm—Birch, Stewart, Kolasch, & Birch, LLP

(57) ABSTRACT

A chargeable resin powder is transported by means of an airstream which is a mixture of air and steam. This enables pneumatic transport of chargeable resin powder without building up electrostatic charges.

7 Claims, 1 Drawing Sheet

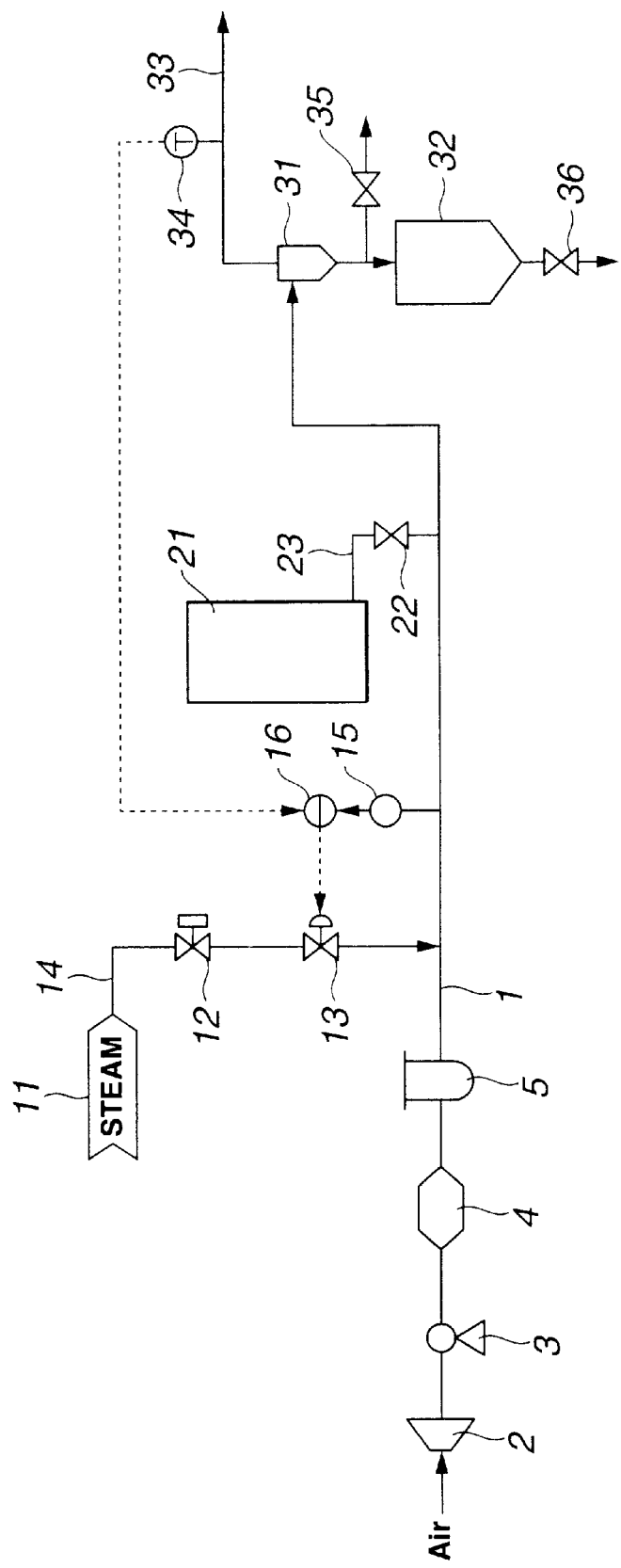

PNEUMATIC TRANSPORT OF CHARGEABLE RESIN POWDER

This invention relates to a method for the pneumatic transport of a chargeable resin powder such as vinyl chloride resin powder.

BACKGROUND OF THE INVENTION

Pneumatic transport is often employed for conveying a large quantity of resin powder such as thermoplastic resin powder. The pneumatic transport is generally carried out by taking air from the ambient atmosphere, compressing the air by a boot blower, and optionally cooling the air.

One class of thermoplastic resin powder includes chargeable resin powders such as vinyl chloride resins, ABS resins and SBC resins. The pneumatic transport is also employed for conveying a large quantity of such chargeable resin powders.

However, during the pneumatic transport of chargeable resin powder, the resin powder tends to build up electrostatic charges due to friction or the like. Electrostatic charging gives rise to the following problems. (i) The resin powder itself is so reduced in bulk density that the transport becomes efficient. (ii) The resin powder forms aggregates or bridges within the transport pipe, reducing the transport efficiency and still worse, causing the pipe to be clogged to substantially restrain pneumatic transport. (iii) After the resin powder is transported to the tank, the powder forms aggregates or bridges in the tank. Since the resin powder is not permitted to fall under gravity upon withdrawal of the resin powder from the tank, it is necessary to apply vibration to the tank in order to withdraw the resin powder from the tank.

SUMMARY OF THE INVENTION

An object of the invention is to provide a novel and improved method for the pneumatic transport of chargeable resin powder which prevents the chargeable resin powder from building up electrostatic charges during the transportation and thus has solved the above problems (i) to (iii).

We learned that when a chargeable resin powder is transported by means of a conveying airstream obtained by compressing air in a boot blower and cooling to about 10 to 70° C. in an after cooler, moisture in the resin powder volatilizes during transportation so that the chargeable resin powder becomes more and more readily chargeable. This, combined with friction among resin particles, causes the chargeable resin powder to readily build up more electrostatic charges. We have found that by using an air/steam mixture obtained by admixing the conveying air with steam, and properly adjusting the humidity of the air/steam mixture, the electrostatic charging of the chargeable resin powder is minimized, thereby preventing a lowering of bulk density, formation of aggregates or bridges, and clogging of the pipe due to electrostatic charging of the chargeable resin powder.

The invention provides a method for transporting a chargeable resin powder by means of an airstream. An air/steam mixture obtained by admixing air with steam is used as the airstream. The chargeable resin is typically a vinyl chloride resin.

In a preferred embodiment, the air/steam mixture is adjusted so as to meet the following relationship:

$$0° C. < (T_1 - K_1)° C. \leq 60° C.$$

wherein $T_1$ is the temperature of the mixture which has been used in pneumatic transport of the powder and separated from the powder and $K_1$ is the dew point of the mixture.

BRIEF DESCRIPTION OF THE DRAWING

The only FIGURE,

FIG. 1 is a diagram illustrating one exemplary system for the pneumatic transport of a chargeable resin powder.

DESCRIPTION OF THE PREFERRED EMBODIMENT

The invention is directed to the pneumatic transport of a chargeable resin powder. The invention uses as the conveying airstream a mixture of air and steam obtained by admixing conveying air with steam.

The chargeable resin powder includes powders of vinyl chloride resins, ABS resins and SBC resins. Preferably the invention is applied to vinyl chloride resin powder.

Referring to FIG. 1, there is illustrated one exemplary system for the pneumatic transport of a chargeable resin powder from a storage tank or silo to a packer tank. The system includes a pneumatic transport pipe 1 extending from an intake to a cyclone 31 and having a suction filter 2, a Roots blower 3, an after cooler 4, and an after filter 5. Air is taken from the ambient atmosphere into the transport pipe 1 and channeled past the suction filter 2 to the Roots blower 3 where it is compressed and elevated in temperature. The hot air is then channeled to the after cooler 4 where it is cooled to 10 to 70° C., preferably 20 to 40° C.

The system also includes a steam supply 11 which is connected by a steam transport pipe 14 having an automatic valve 12 and a regulating valve 13 to the pneumatic transport pipe 1 at a position downstream of the after filter 5. Steam from the steam supply 11 is admixed with the air that has been cooled in the after cooler 4 and passed through the after filter 5, giving an air/steam mixture. Disposed in the pneumatic transport pipe 1 downstream of the connection to the steam transport pipe 14 is a dew point detector 15 for detecting the absolute humidity of the air/steam mixture, that is, the weight of steam per kilogram of the air/steam mixture. The dew point detector 15 is connected to a controller 16 which is, in turn, connected to the regulating valve 13. The controller 16 controls the degree of opening of the regulating valve 13 in accordance with the absolute temperature value detected by the dew point detector 15, for regulating the flow rate of steam fed to the pneumatic transport pipe 1.

The system further includes a storage tank or silo 21 for containing chargeable resin powder. The storage tank 21 is connected through a powder feed pipe 23 having a rotary valve 22 to the pneumatic transport pipe 1 at a position downstream of the dew point detector 15. The chargeable resin powder is fed into the air/steam mixture flowing through the pneumatic transport pipe 1 whereby the powder is conveyed to the cyclone 31.

In the cyclone 31, the powder conveyed by means of the air/steam mixture is separated from the air/steam mixture and fed to a packer tank 32. On the other hand, the air/steam mixture separated from the powder is discharged to the ambient atmosphere through a release pipe 33. A thermometer 34 is attached to the release pipe 33 for measuring the temperature of the air/steam mixture separated from the powder, and also connected to the controller 16 so that the controller 16 receives the temperature information. Valves 35 and 36 are disposed upstream and downstream of the packer tank 32, respectively.

The system constructed as above operates as follows. Air taken in from the ambient atmosphere is compressed to assume an elevated temperature in the Roots blower 3, then cooled in the after cooler 4 before it is admixed with steam. Prior to the admixing with steam, the air is typically adjusted to a pressure of 0.01 to 0.1 MPa, a flow rate of 20 to 100 Nm³/min and a temperature of 10 to 70° C.

Steam is fed through the steam transport pipe 14, regulated in flow rate by the regulator valve 13 and introduced into the pneumatic transport pipe 1 where it is admixed with the airstream. The steam typically has a pressure of 0.1 to 1 MPa. According to the invention, steam is injected into and admixed with the air. Since it is steam that is injected into the conveying air, admixing of steam with the air is quick enough to achieve uniform dispersion. This ensures that the dew point detector located downstream of the point of injection of steam into the air provides stable measurement of a dew point (absolute humidity).

The feature of the invention is to use a mixture of air and steam as the airstream for transporting powder. In a preferred embodiment, the flow rate of steam injected into the pneumatic transport pipe 1 is adjusted so that the air/steam mixture may meet the following relationship:

$$0°\ C. < (T_1 - K_1)°\ C. \leq 60°\ C.,$$

and preferably $1°\ C. < (T_1 - K_1)°\ C. \leq 15°\ C.$

Herein $T_1$ is the temperature of the air/steam mixture which has been used in pneumatic transport of the powder and separated from the powder, and in the illustrated embodiment, separated from the powder in the cyclone 31 and discharged therefrom. This is the temperature detected by the thermometer 34 in the illustrated embodiment. $K_1$ is the dew point of the air/steam mixture. In the illustrated embodiment, the flow rate of steam is regulated by transmitting the detected values of the dew point detector 15 and thermometer 34 to the controller 16, and controlling the degree of opening (inclusive of fully open or closed state) of the regulating valve 13 so as to provide the desired difference $(T_1-K_1)$. If $T_1-K_1 \leq 60°\ C.$, antistatic effects are exerted, but there arises the situation that the resin particles separated in the cyclone 31 bear excessive moisture on their surface and in extreme cases, carry water droplets thereon, with a likelihood that the resin powder will form aggregates in the destination (packer tank 32 in FIG. 1) and water droplets will collect therein. If $T_1-K_1 > 60°\ C.$, antistatic effects may become insufficient.

EXAMPLE

Examples of the invention are given below by way of illustration, but the invention is not limited thereto. It is noted that the pneumatic transport system used is as illustrated in FIG. 1 and includes a packer tank 32 having a volume of 200 m³.

Example 1

Step 1

With the Roots blower 3 and after cooler 4 actuated, air was flowed through the pneumatic transport pipe 1. The air downstream of the after cooler 4 had a pressure of 0.05 MPa, a temperature of 40° C. and a flow rate of 50 Nm³/min.

Step 2

With the automatic valve 12 and regulating valve 13 opened, steam was fed from the steam supply 11 to the pneumatic transport pipe 1 through the steam transport pipe 14. The controller 16 was operated to control the regulating valve 13 so as to set $T_1-K=3°\ C.$ Step 3

With the rotary valve 22 opened, a vinyl chloride resin powder (PVC, TK-1000 by Shin-Etsu Chemical Co., Ltd., average degree of polymerization 1,000) was fed from the storage tank 21 to the pneumatic transport pipe 1 at a flow rate of 8 t/hr. The PVC powder was conveyed to the cyclone 31 and then to the packer tank 32.

Step 4

The operation of conveying the PVC powder was interrupted when the PVC powder accumulated to 20 m³ in the packer tank 32.

Step 5

Immediately before the interruption, with the valve 35 opened, the steam conditioned PVC powder was taken out and measured for bulk density in non-charge-eliminated and charge-eliminated states by the test method to be described later. The results are shown in Table 1.

Step 6

After the completion of PVC powder transportation, with the valve 36 opened, the PVC powder was withdrawn from the packer tank 32 and the interior of the packer tank 32 was visually inspected. The results are also shown in Table 1.

Comparative Example 1

The PVC powder was pneumatically transported as in Example 1 except that Step 2 of steam conditioning was omitted. The PVC powder was measured for bulk density in non-charge-eliminated and charge-eliminated states, and the packer tank 32 from which the PVC powder had been withdrawn was inspected. The results are shown in Table 1.

Measurement of Non-Charge-Eliminated Bulk Density

A sample of the PVC powder was directly measured for bulk density according to JIS K-6721.

Measurement of Charge-Eliminated Bulk Density

A sample of the PVC powder was treated with ethyl alcohol to eliminate electrostatic charges before it was measured for bulk density according to JIS K-6721.

TABLE 1

| | | Non-charge-eliminated bulk density (g/cm³) | Charge-eliminated bulk density (g/cm³) | Packer tank interior after PVC powder withdrawal |
|---|---|---|---|---|
| Example 1 | steam conditioned PVC powder | 0.540 | 0.542 | The tank was substantially emptied of the PVC powder, finding no aggregates or bridges of PVC powder |
| Comparative Example 1 | non-steam-conditioned PVC powder | 0.503 | 0.541 | PVC powder was left in the tank, finding aggregates and bridges of PVC powder |

According to the invention, a resin powder which is electrostatically chargeable can be pneumatically transported without building up electrostatic charges.

Japanese Patent Application No. 2000-164393 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A pneumatic transport method for transporting a powder of a chargeable resin comprising the steps of:

I. providing a stream of air; and then

II. adding steam to the stream of air thereby producing an initial air-steam mixture; and then III. mixing the powder with the initial air-steam mixture thereby producing a powder-laden pneumatic stream; and then IV. conveying the powder-laden pneumatic stream to a zone where the powder is removed from the powder-laden pneumatic stream, thereby producing a powder-depleted stream;

wherein the amount of steam added to the initial air-steam mixture is adjusted so as to meet the following relationship:

$$0°\ C.<(T_1-K_1)°\ C.\leqq 60°\ C.$$

wherein $T_1$ is the temperature of the powder-depleted stream; and wherein $K_1$ is the dew point of the initial air-steam mixture.

2. The method of claim 1 wherein the amount of steam added to the initial air-steam mixture is adjusted so as to meet the following relationship:

$$1°\ C.<(T_1-K_1)°\ C.\leqq 15°\ C.$$

3. A pneumatic transport method for transporting a powder of a chargeable resin comprising the steps of:

I. providing a stream of air; and then

II. adding steam to the stream of air thereby producing an initial air-steam mixture; and then III. mixing the powder with the initial air-steam mixture thereby producing a powder-laden pneumatic stream; and then IV. conveying the powder-laden pneumatic stream to a zone where the powder is removed from the powder-laden pneumatic stream;

wherein the amount of steam present in the initial air-steam mixture is sufficient such that (a) no electrostatic charge builds up on the powder; and (b) there is no agglomeration of the powder when the powder is removed from the powder-laden pneumatic stream.

4. The method claim 3 wherein the resin is a vinyl chloride resin.

5. The method of claim 3 wherein the resin is poly vinyl chloride.

6. A pneumatic transport method for transporting a powder of a chargeable resin comprising the steps of:

I. providing a stream of air; and then

II. adding steam to the stream of air thereby producing an initial air-steam mixture having a temperature of 10° C. to 70° C.; and then III. mixing the powder with the initial air-steam mixture thereby producing a powder-laden pneumatic stream; and then IV. conveying the powder-laden pneumatic stream to a zone where the powder is removed from the powder-laden pneumatic stream, thereby producing a powder-depleted stream;

wherein the amount of steam added to the initial air-steam mixture is adjusted so that (a) no electrostatic charge builds up on the powder; and (b) there is no agglomeration of the powder when the powder is removed from the powder-laden pneumatic stream.

7. The method of claim 6 wherein the temperature of the initial air-steam mixture is 20° C. to 40° C.

* * * * *